United States Patent [19]
Rogers

[11] Patent Number: 6,014,950
[45] Date of Patent: Jan. 18, 2000

[54] DOG TEETHING TOY

[76] Inventor: Nancy G. Rogers, 12919 82nd Ct., Palos Park, Ill. 60464

[21] Appl. No.: 08/990,170

[22] Filed: Dec. 12, 1997

[51] Int. Cl.[7] .................................................. A01K 29/00
[52] U.S. Cl. ............................................................. 119/710
[58] Field of Search ............................ 119/709, 710, 119/711, 28.5; 5/652, 657.5; 15/208

[56] References Cited

U.S. PATENT DOCUMENTS

| | | | |
|---|---|---|---|
| D. 358,911 | 5/1995 | Hotta et al. | D30/160 |
| D. 374,519 | 10/1996 | Ruble | D30/160 |
| D. 374,520 | 10/1996 | Plunk | D30/160 |
| D. 374,748 | 10/1996 | Plunk | D30/160 |
| D. 378,151 | 2/1997 | Plunk | D30/160 |
| 2,315,968 | 4/1943 | Krakauer | 5/657.5 X |
| 2,638,157 | 5/1953 | Cook | 5/657.5 X |
| 2,988,045 | 6/1961 | Fisher . | |
| 3,198,173 | 8/1965 | Fisher . | |
| 4,133,296 | 1/1979 | Smith . | |
| 4,535,725 | 8/1985 | Fisher . | |
| 4,831,676 | 5/1989 | Denmark | 15/104.93 |
| 5,022,093 | 6/1991 | Hall | 2/158 |
| 5,074,249 | 12/1991 | McMahon | 119/709 |
| 5,682,838 | 11/1997 | Reich | 119/711 |

*Primary Examiner*—Robert P. Swiatek
*Attorney, Agent, or Firm*—Seyfarth, Shaw, Fairweather & Geraldson

[57] ABSTRACT

A rolled or folded terry cloth dog teething toy which can be saturated with water and frozen. The frozen teething toy provides relief for teething pain and gum soreness and is enticing to a dog.

30 Claims, 3 Drawing Sheets

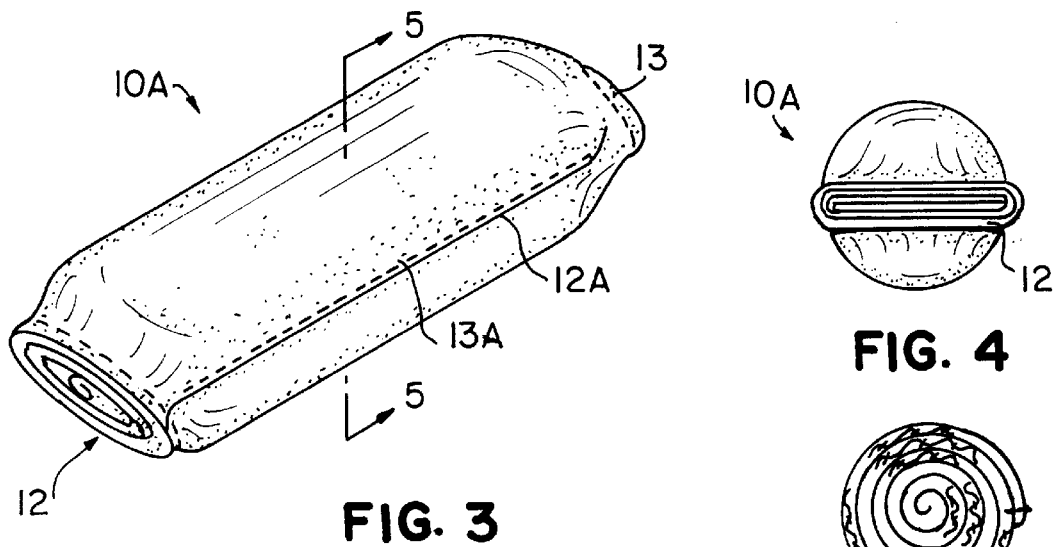
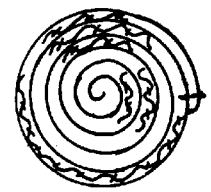
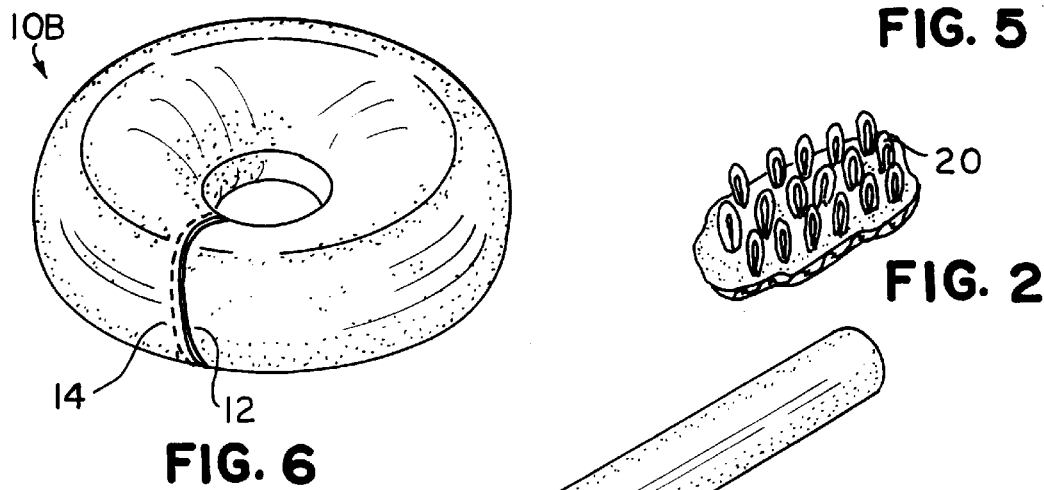
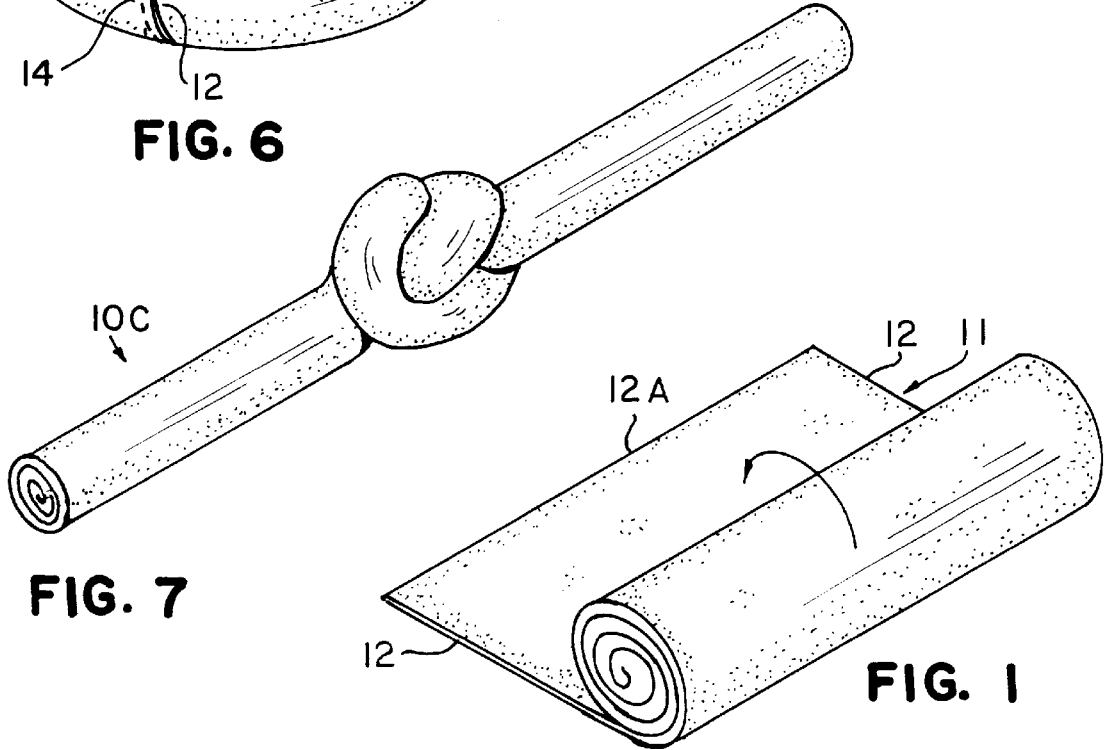

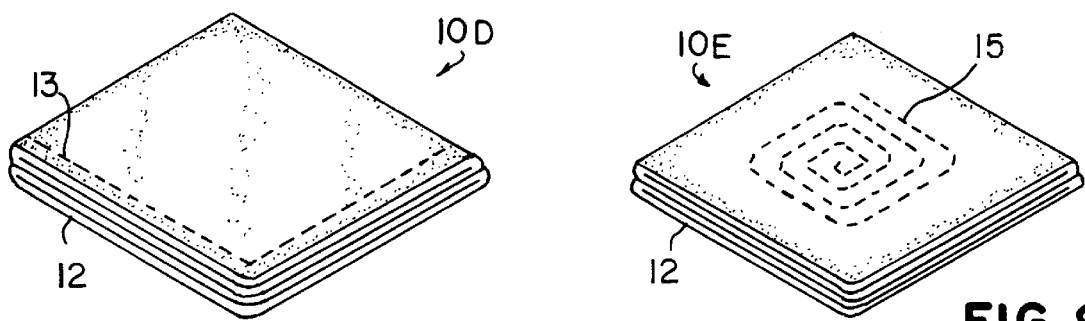
FIG. 8
FIG. 9
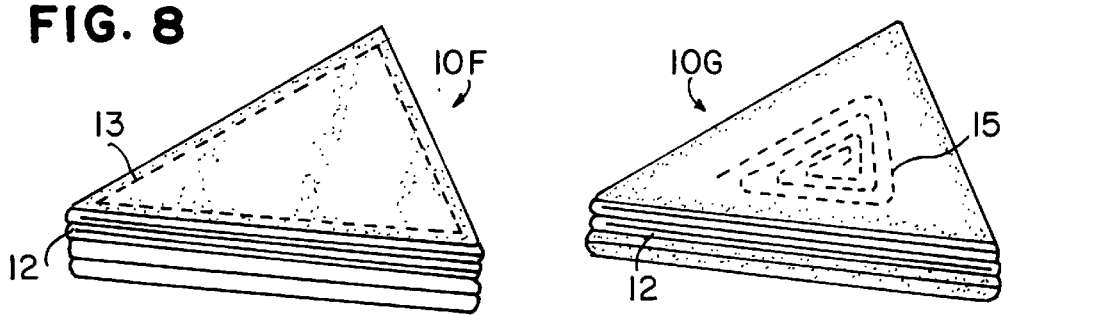
FIG. 10
FIG. 11
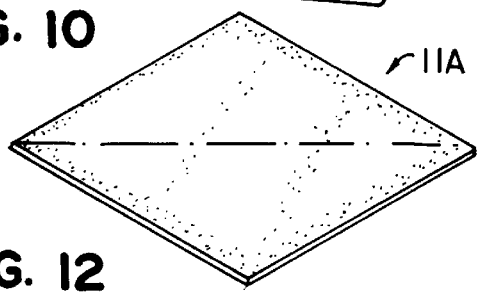
FIG. 12
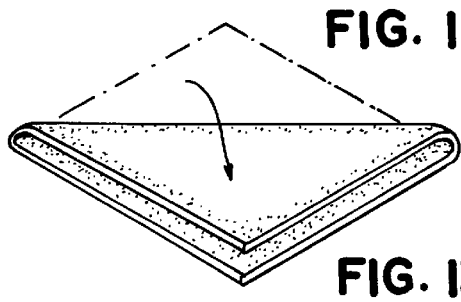
FIG. 13
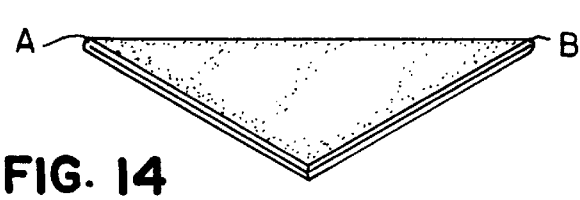
FIG. 14
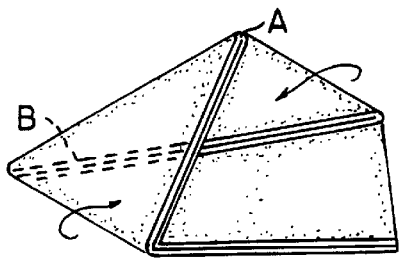
FIG. 15
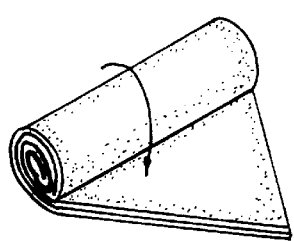
FIG. 16
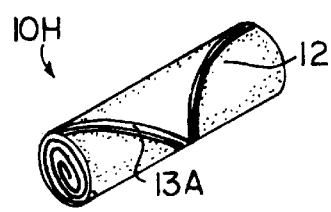
FIG. 17

DOG TEETHING TOY

The present invention relates to dog toys and, more particularly, to freezable terry cloth dog toys suitable for repeated use, especially by teething dogs.

BACKGROUND OF THE INVENTION

Dogs use their mouths to explore and chew on objects throughout their lives as a normal, genetically-driven behavior. A dog's teething stage, similar to a human's teething stage, is a time of increased chewing that can last for up to one year and chewing during that time relieves aching and builds up jaw muscles. Even after teething, however, dogs continue to chew. Chewing cleans teeth, decreases boredom, stimulates a dog's mind, and calms a dog. When no alternatives are available, dogs often chew on household objects such as furniture or shoes. Dog owners have thus long recognized the effectiveness of chewable toys as a source of pet happiness and a means of preventing their pets from chewing on furniture, shoes, and other valuable household objects.

Dog owners have also recognized that dogs enjoy playing by chewing on both frozen substances, which are helpful in decreasing swelling and relieving teething pain and soreness, and cloth. Dog owners have further recognized that dogs, like teething humans, seek to decrease swelling and relieve oral pain and soreness by chewing on available items and that frozen substances are especially well adapted to relieve such swelling, pain, and soreness, as well as prevent dry mouth and quench thirst. There are many toys that serve some of those functions, which toys must satisfy several criteria. First, the toy must be constructed of a chewable, nontoxic material that will not injure a pet or a person. Second, the toy must provide some means of decreasing swelling and relieving teething pain and soreness, as well as preferably cleaning teeth to prevent gum disease and infection. Third, the toy must be enticing to the dog that chews it.

Many chewable, non-toxic materials have been used in the fabrication of pet toys, most prominently rawhide, leather, vinyl, and heavyweight fabrics, such as denim. While such materials may be durable because of their weight and strength, they have concomitant drawbacks due to that weight and strength, as well as their hardness and stiffness. Such materials cannot be easily and effectively cleaned and may contain dyes, which may lead to staining of household objects or clothing when the toys are used both outside and inside. In addition, because of their hardness and stiffness, toys made of such materials can injure pets or people and break furniture if swung or thrown. Furthermore, such materials retain water quite poorly and have low specific heats. They therefore neither numb dogs' gums nor provide substantial relief from teething pain and soreness. Additionally, as a dog chews on and plays with toys made of such known materials, pieces of the toys may break off or the toy itself may disintegrate. Such disintegration generally makes the toys less enticing to a dog and messier for the dog's owner and, when pieces break off, creates a potential choking hazard to the dog. These pieces can also cut a dog's gastrointestinal lining, allow for the growth of infection-causing bacteria, or cause intestinal blockage. Finally, because of their hardness and stiffness, such materials generally irritate a teething dog's gums, do not provide relief from teething pain and soreness, and further do not clean a dog's teeth effectively.

Other materials that have been used in the prior art as dog toys include lightweight fabric and foam. Such materials generally lack the durability necessary for continued playing by dogs. Like heavier materials, they may be difficult to clean and may contain dyes, which may lead to staining of household objects or clothing. Also, as with heavier materials, as a dog chews on and plays with toys made of such known lightweight materials, pieces of the toys may disintegrate. Such disintegration generally makes the toys less enticing to a dog and messier for the dog's owner. In addition, while such materials tend not to irritate a dog's gums in the same manner as heavier weight materials do and can help clean teeth, they generally also retain water poorly and have low specific heats and therefore do not effectively numb a dog's gums to alleviate teething pain.

SUMMARY OF THE INVENTION

It is, therefore, a general object of the present invention to provide a freezable dog teething toy which avoids the disadvantages of prior dog toys, while affording additional practical, structural, and manufacturing advantages.

A fundamental feature of the present invention is the provision of a dog toy formed of a water-absorbent, scent-absorbent material.

An important feature of the invention is the provision of a dog toy of the type set forth wherein the toy is constructed of a chewable, non-toxic material that will not injure a pet or person or harm or stain other objects.

Another feature of the present invention is the provision of a dog toy which provides a means of decreasing swelling, of relieving teething pain and soreness, and of cleaning teeth.

Another feature of the present invention is the provision of a dog toy which is enticing to the dog that chews it, yet withstands substantial chewing and pulling.

Another feature of the present invention is the provision of a dog toy which is simple and inexpensive to manufacture, requiring no specialized technology or machinery.

Another feature of the present invention is the provision of a dog toy which can be formed into a wide variety of shapes.

In accordance with the present invention, the inventor has found that dog toys made of terry cloth satisfy all of the criteria required of dog teething toys, especially through being water absorbent so that they can be easily frozen. Such terry cloth toys also allow a dogs teeth to penetrate to their interior, scrubbing plaque and other foreign materials off of a dog's teeth as the dog repeatedly bites into the toy. This effect increases as the toy defrosts after freezing. Furthermore, while toys made of heavyweight and lightweight materials tend to be enticing to dogs, toys made of terry cloth provide, in the inventor's experience, an additional enticement. A dog can pull each loop of the terry cloth fabric of such a toy apart individually. Even when a dog pulls the loops of a terry cloth toy apart, however, the toy disintegrates very slowly (generally staying as a single sheet of cloth), does not create a messy cleaning job for the owner, and does not create a choking hazard for the dog.

Further objects, features, and advantages of the invention will become evident from a consideration of the following detailed description, when taken in conjunction with the accompanying drawings and the appended claims.

BRIEF DESCRIPTION OF THE DRAWINGS

To facilitate an understanding of the invention, a preferred embodiment thereof is illustrated in the accompanying drawings, from an inspection of which, when considered in connection with the following description, its construction, its operation, and many of its advantages should be readily understood and appreciated.

FIG. 1 is a perspective view depicting the rolling step of the process of manufacturing a preferred embodiment of a dog teething toy in accordance with the present invention;

FIG. 2 is an enlarged, fragmentary, perspective view of the material of a dog teething toy in accordance with the present invention;

FIG. 3 is a perspective view of a first preferred embodiment of a dog teething toy in accordance with the present invention;

FIG. 4 is an end elevational view of the toy of FIG. 3;

FIG. 5 is a cross-sectional view taken along the line 5—5 of the toy of FIG. 3;

FIG. 6 is a perspective view of a second preferred embodiment of a dog teething toy in accordance with the present invention;

FIG. 7 is a perspective view of a third preferred embodiment of a dog teething toy in accordance with the present invention;

FIG. 8 is a perspective view of a fourth preferred embodiment of a dog teething toy in accordance with the present invention;

FIG. 9 is a perspective view of a fifth preferred embodiment of a dog teething toy in accordance with the present invention;

FIG. 10 is a perspective view of a sixth preferred embodiment of a dog teething toy in accordance with the present invention;

FIG. 11 is a perspective view of a seventh preferred embodiment of a dog teething toy in accordance with the present invention;

FIG. 12 is an perspective view of a sheet of terry cloth used in the process of manufacturing an eighth preferred embodiment of a dog teething toy in accordance with the present invention;

FIGS. 13 and 14 are perspective views depicting the first folding step in the process of manufacturing an eighth preferred embodiment of a dog teething toy in accordance with the present invention;

FIG. 15 is a perspective view depicting the second and third folding steps in the process of manufacturing an eighth preferred embodiment of a dog teething toy in accordance with the present invention;

FIG. 16 is a perspective view depicting the rolling step of the process of manufacturing an eighth preferred embodiment of a dog teething toy in accordance with the present invention;

FIG. 17 is a perspective view of the eighth preferred embodiment of a dog teething toy in accordance with the present invention, formed as illustrated in FIGS. 12 through 16;

DETAILED DESCRIPTION OF THE PREFERRED EMBODIMENTS

Figure 18:
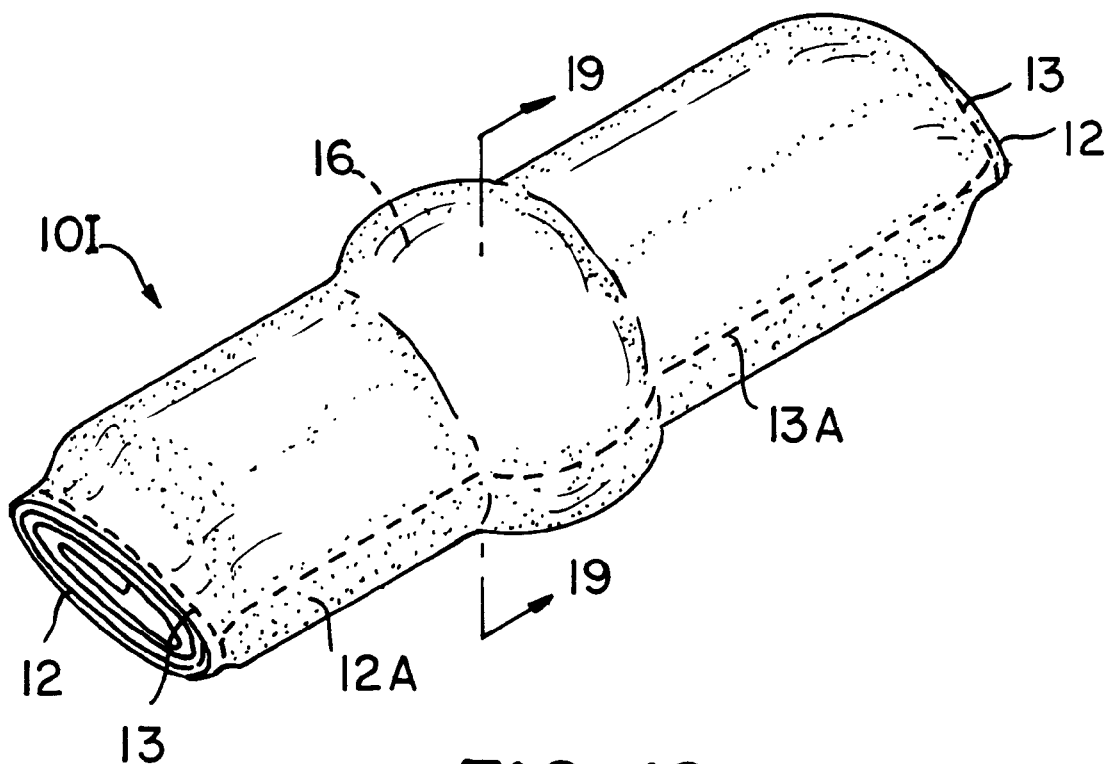
FIG. 18 is a perspective view of the ninth preferred embodiment of a dog teething toy in accordance with the present invention.

Referring to FIGS. 3, 6–11, 17, and 18, there are illustrated dog teething toys 10A—10I formed of a sheet 11 of terry cloth (FIG. 1) constructed in accordance with the present invention. In a preferred embodiment of the current invention, the terry cloth used to form the sheet 11 has closed loops 20 on its surface, as shown in FIG. 2. Other forms of terry cloth, such as those with a velour surface, may also be used. The sheet 11 of terry cloth has side edges 12 and end edges 12A (one shown in FIG. 1) and is preferably rolled or folded into a predetermined shape, such as a cylinder (shown in FIGS. 3, 17, and 18), a torus (shown in FIG. 6), a knotted cylinder (shown in FIG. 7), a rectangular parallelpiped (shown in FIGS. 8 and 9), or a triangular prism (shown in FIGS. 10 and 11).

The preferred embodiments of the current invention are produced preferably by rolling, folding, or rolling and folding a sheet of terry cloth into a predetermined shape, so that portions of the sheet are disposed in overlapping contact with one another. As shown in FIG. 1, one preferred embodiment is produced by rolling a substantially rectangular sheet 11 of terry cloth into a cylinder. As shown in FIGS. 12–16, another preferred embodiment of the current invention is produced by, first, folding a substantially square sheet 11 A of terry cloth to form a triangle, as in FIGS. 13 and 14, folding the opposite corners A and B toward each other, as in FIG. 15, then rolling the folded sheet of terry cloth into a cylinder, as in FIG. 16. The cylinders resulting from the steps of FIGS. 1 or 16 may then be stitched closed (as shown in FIG. 3 or FIG. 17), shaped into a torus (as shown in FIG. 6), or tied into a knot (as shown in FIG. 7). Other preferred embodiments, as shown in FIGS. 8–11, may be produced by repeated folding steps, similar to that shown in FIG. 13.

It is a significant aspect of a preferred embodiment of the current invention that, after rolling and/or folding, exposed peripheral edges 12 or 12A may be secured by stitching 13 and 13A, respectively, to other areas of the toy. More particularly, as shown in FIG. 3, at each end of the cylindrical roll, the corresponding peripheral edge 12 is exposed in a coil. The end is compressed and overlapping layers of the roll are sewn tightly to one another. The exposed end edge 12A is sewn to the underlying layer or layers, as at 13A, resulting in a closed shape, so as to maintain the toy's integrity after continued chewing and playing. The stitching 13 used in sewing the edges upon the external surface of the toy 10 preferably passes through several layers of the rolled or folded terry cloth, but not necessarily through the entire thickness of the toy.

In the embodiment of FIG. 6, after the roll of FIG. 1 is formed, the free end edge 12A is stitched as at 13A (FIG. 3) and then the cylinder is bent into a ring, with the abutting ends sewn together, as at 14. Alternatively, the cylindrical roll may be tied into one or more knots, as in FIG. 7.

In alternative embodiments of the current invention, as shown in FIGS. 9 and 11, the overlapping layers of the folded sheet may be stitched together, as at 15, in regions spaced from the periphery of the folded shape, either in lieu of or in addition to stitching along the periphery. While stitching only at central regions renders the toy less durable and does not maintain the integrity of the toy as well as the peripheral stitching does, it provides a greater number of accessible loose terry cloth loops 20 on the surface of the toy as an additional enticement to the dog.

Figure 19:
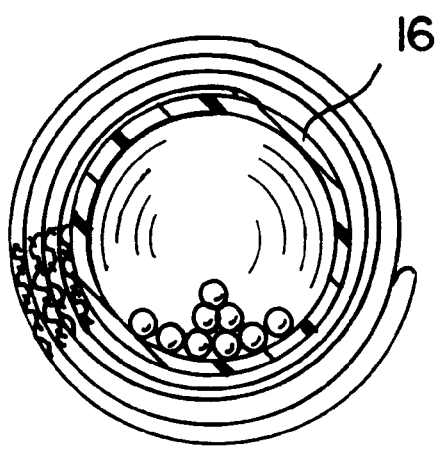
FIG. 19 is a cross-sectional view taken along the line 19—19 of the toy of FIG. 18.

In one preferred embodiment, as shown in FIG. 18, the sheet 11 of terry cloth is rolled around a central element 16. The central element 16, while preferably being formed of terry cloth, can be formed of any material or object attractive or enticing to a dog. For example, such a central element may be impregnated with a scent enticing to a dog, formed of a material with a texture different from that of terry cloth, or include some other device, such as a squeaker or rattle (as shown in FIG. 19), enticing to a dog. Such a central element may also contain some other substance beneficial to a dog, such as a breath sweetener, scented element, or medicine.

In the preferred use of the invention, the dog toy is first thoroughly wetted so as to be saturated with water. The dog toy may then be placed in a preformed plastic container or freezer-ready bag shaped to accommodate the predetermined shape of the toy and placed in a freezer. After time sufficient for the water absorbed by the terry cloth of the toy to freeze, the toy is removed and can be used for play by a dog. In that state, it numbs the dog's gums, diminishes swelling, and provides a somewhat stiffer, more durable toy.

It should also be understood that the present invention might also be suited for the relief of teething pain in humans.

The invention has been described above in an illustrative manner and it is to be understood that terminology which has been used is intended to be in the nature of description rather than of limitation. Obviously many modifications and variations of the present invention are possible in light of the above teachings. It is therefore to be understood that within the scope of the appended claims, the invention may be practiced otherwise than as specifically described.

What is claimed is:

1. A one-piece teething toy for an animal consisting essentially of:
   a single sheet of absorbent cloth having peripheral edges
   said sheet being arranged in a predetermined shape having multiple layers disposed in overlapping contact with one another and with at least portions of said peripheral edges exposed, and
   stitching securing together overlapping layers of said sheet along exposed ones of said peripheral edges for securing said sheet in said predetermined shape.

2. The teething toy of claim 1, wherein said sheet is formed of a pile fabric cloth.

3. The teething toy of claim 2, wherein said sheet is formed of terry cloth.

4. The teething toy of claim 1, wherein said sheet is folded.

5. The teething toy of claim 4, wherein said folded sheet is in the shape of a rectangular parallelpiped.

6. The teething toy of claim 4, wherein said folded sheet is in the shape of a triangular prism.

7. The teething toy of claim 1, wherein said sheet is folded and rolled into plural spiral convolutions.

8. The teething toy of claim 7, wherein said folded and rolled sheet is cylindrical in shape.

9. The teething toy of claim 1, wherein overlapped portions of said sheet are stitched together along all of the exposed ones of said edges.

10. A one-piece teething toy for an animal comprising:
    a single sheet of absorbent cloth having a peripheral edges,
    said sheet being a arranged in a roll of plural spiral convolutions having multiple layers disposed in overlapping contact with one another and with at least portions of said peripheral edges exposed, and
    stitching securing together overlapping layers of said sheet along exposed ones of said peripheral edges for securing said sheet in said roll.

11. The teething toy of claim 10, wherein said roll is cylindrical in shape.

12. The teething toy of claim 11, wherein said cylindrical roll is tied in at least one knot.

13. The teething toy of claim 10, wherein said roll has ends joined together to form a torus.

14. A teething toy for an animal comprising:
    a central element; and
    an outer element completely enclosing said central element and consisting essentially of
    a single sheet of absorbent cloth having peripheral edges,
    said sheet being arranged in a predetermined shape and having multiple layers disposed in overlapping contact with one another and surrounding the entire central element with at least portions of said peripheral edges exposed, and,
    stitching securing together overlapping layers of said sheet along exposed ones of said peripheral edges for securing said sheet in said predetermined shape.

15. The teething toy of claim 14, wherein said sheet is formed of a pile fabric cloth.

16. The teething toy of claim 15, wherein said sheet is formed of terry cloth.

17. The teething toy of claim 14, wherein said sheet is arranged in a roll including plural spiral convolutions.

18. The teething toy of claim 17, wherein said roll is cylindrical in shape.

19. The teething toy of claim 18, wherein said cylindrical roll is tied in at least one knot.

20. The teething toy of claim 18, wherein said roll has ends joined together to form a torus.

21. The teething toy of claim 14, wherein said sheet is folded.

22. The teething toy of claim 21, wherein said folded sheet is in the shape of a rectangular parallelpiped.

23. The teething toy of claim 21, wherein said folded sheet is in the shape of a triangular prism.

24. The teething toy of claim 14, wherein said sheet is folded and rolled.

25. The teething toy of claim 24, wherein the predetermined shape of said folded and rolled sheet is a cylinder.

26. The teething toy of claim 14, wherein the central element includes a rattle.

27. The teething toy of claim 14, wherein the central element includes a squeaking element.

28. The teething toy of claim 14, wherein the central element includes a scented element.

29. The teething toy of claim 14, wherein the central element includes a breath sweetening element.

30. The teething toy of claim 14, wherein the central element includes medicine.

* * * * *